March 31, 1964  J. E. GASTONGUAY  3,126,848
APPARATUS FOR MAKING PILLOW SLIPS
Filed Dec. 5, 1960  6 Sheets-Sheet 5

INVENTOR.
Joseph E. Gastonguay
BY Roberts Cushman & Grover
Att'ys 3,126,848
APPARATUS FOR MAKING PILLOW SLIPS
Joseph E. Gastonguay, Lewiston, Maine, assignor to Pepperell Manufacturing Company, Boston, Mass., a corporation of Massachusetts
Filed Dec. 5, 1960, Ser. No. 73,770
21 Claims. (Cl. 112—10)

This invention relates to apparatus for making pillow slips and has for its principal objects to deliver tubular material to a cutter, sever the pillow slip lengths therefrom, sew the slips at one end and then stack them. Other objects are to provide a machine of the foregoing kind which will sew one side of folded material to form a tube, prior to cutting into pillow slip length, drawn from a source of prefolded sheet material, or from a source of flat material which is folded in process, including means for aligning the edges to be sewn; and to provide means for detecting and eliminating from the tubular material defects to minimize waste. Further objects are to provide an apparatus which is efficient; has high productive capacity; requires very little maintenance; and does not require skilled operators.

As herein illustrated, the apparatus has a horizontally disposed side-seaming support with a cutter situated between its ends for cutting transversely of tubular material moving therealong. There is a first conveyor on the side-seaming support for advancing a length of tubular material from the supply, up to the cutter, and a second conveyor operable to grip the leading end of the tubular material, as it is moved forwardly beneath the cutter, to pull a predetermined length forwardly for cutting. The conveyors are movable in timed relation to present successive slip lengths of tubular material to the cutter and there is means operable when the second conveyor reaches the end of its movement to effect operation of the cutter. At one side of the side-seaming support, at the forward side of the cutter, there is an end-seaming support with a sewing machine mounted adjacent an edge thereof. A transfer conveyor is associated with the end-seaming support for moving a cut slip from the side-seaming support onto the end-seaming support and feeding it therealong relative to the sewing machine to close an end thereof. The transfer conveyor has a part overlapping the side-seaming support and the marginal edge of the slip resting thereon, but normally elevated therefrom, and there is means operable, following cutting of the slip, to lower the normally elevated part of the transfer conveyor onto the edge of the slip to remove it from the side-seaming support. Near the far end of the end-seaming support there is a thread cutter operable to cut the trailing ends of the sewing thread and a stacking conveyor for removing the finished slip and depositing it on a depressible stack support. The apparatus also includes a sensing device for detecting flaws in the tubular material and means operable thereby to render the means for effecting operation of the cutter at the end of the forward movement of the second conveyor inoperative and operating the cutter so that it severs the tubular material at the instant the defect clears the forward side of the cutter. There are also normally open jaws situated at the forward end of movement of the second conveyor which are brought into operation only when the sensing device detects a flaw to grip the defective piece and eject it from the apparatus. The apparatus also includes means for folding or delivering folded material to a sewing machine on the side-seaming support for making the side-seam, guides for aligning the edges prior to side sewing, means for advancing the same toward the forward end of the side-seaming support, and an accumulator for insuring an adequate supply of material at all times.

The invention will now be described in greater detail with reference to the accompanying drawings wherein.

Figure 1:
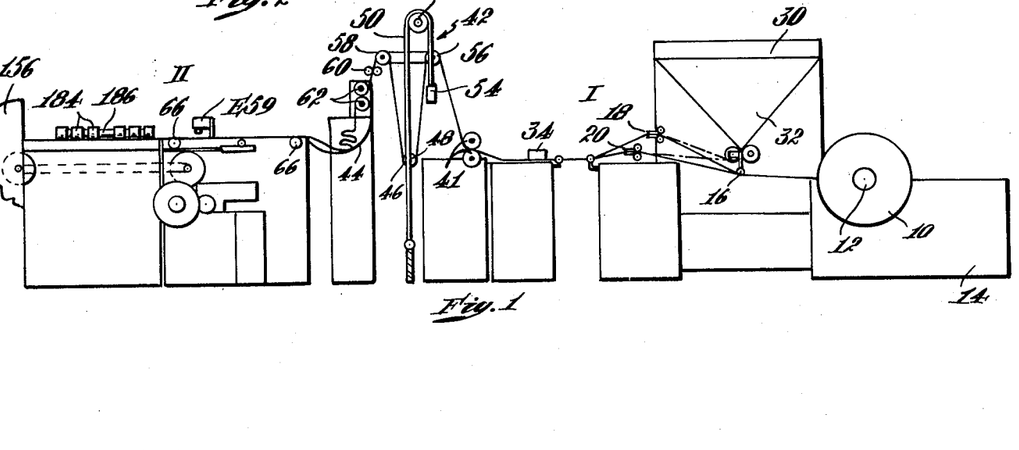
FIG. 1 is a side elevation of the apparatus forming the subject matter of the present invention, showing sheet folding mechanism, side-seaming mechanism, cutting mechanism and conveyor means.

Referring to the drawings, the apparatus comprises, in general, a first section I (FIGS. 1 and 2), in which the adjacent edges of sheet material, folded medially, are aligned and sewn to form a tube which may be cut up into pillow slip lengths, a second section II (FIGS. 1 and 2) for supplying a predetermined length of tubular material to a cutter for cutting off a pillow slip length and for positioning the cut length for sewing of an end, and a third section III (FIG. 6) for sewing of the end of the pillow slip and stacking the successive pillow slips in five dozen lots.

The sheet material of which the pillow slips are made may be supplied already folded from a roll 10 (FIGS. 1 and 2), of the material, wound on a core 12, the latter being journaled at its ends on a support 14. When thus supplied, the folded sheet material is drawn from the top side of the roll 10, beneath a guide bar 16 to a pair of edge guides 18 and 20, which shift the upper and lower plies of the folded material relative to each other to bring them into alignment in accordance with conventional practice. Instead of supplying the material already folded it may alternatively be supplied flat from a roll 21 supported between a pair of spaced parallel bearing rolls 22. When thus supplied the material is led from the top of the roll 21 under a roll 24, thence upwardly over a roll 26, thence downwardly below a guide bar 28, and finally over a bar 30 and downwardly to a triangular folder 32. From the folder the sheet material is led by driven feed rolls 41 through the folding assembly, edge gauges 18 and 20, and sewing machine 34. Sheet pulling and doubling apparatus of this kind is conventional, as shown, for example, in Patent No. 2,321,010.

The folded material, aligned by the edge gauges 18 and 20, is moved forwardly toward a side sewing machine 34, by means which will be described hereinafter, being held transversely taut by an edge guide in the form of a slender runner 36 (FIG. 2), which is held between the plies against the closed or folded edge of the material by a pair of spring-pressed rods 38, supported in cylinders 40. The side sewing machine 34 is supported at the open edges of the material and operates to sew the edges of the plies together as the material is advanced.

The sewn tubular material is moved forwardly by a pair of transversely disposed feed rolls 41 which pull the cloth from the folding assembly through the sewing machine and through a pair of nip rolls 62 which draw it through a compensator 42 and deliver it to a scray 44 for cloth accumulation. The compensator 42 comprises a movable compensator roll 46 supported at its ends in bearing blocks 48, the latter being fastened to endless chains 50—50 which are entrained about sprockets 52—52 and which have fastened to their ends counterweights 54—54. As the tubular material leaves the feed rolls it passes upwardly over an idle roll 56 fixed with respect to the compensator roll 46, then downwardly beneath the compensator roll 46, thence upwardly over a second idle roll 58, which is also fixed relative to the compensator roll, then downwardly between a pair of guide rolls 60 and the nip rolls 62 to the scray 44. The compensator functions to take up the excess of material delivered to the scray by the nip rolls 62, if the material begins to pile up in the scray, on the one hand and, on the other hand, gives up material to the scray when the latter becomes depleted.

Figure 3:
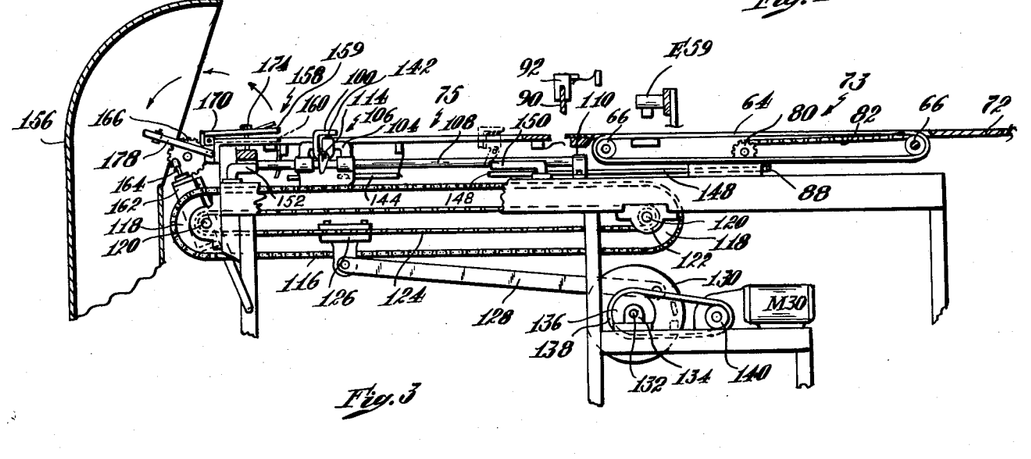
FIG. 3 is an elevation, partly in section, of the left-hand end of the apparatus, showing the pick-up finger driving means, cutting means and the waste-ejecting means to larger scale.
Figure 4:
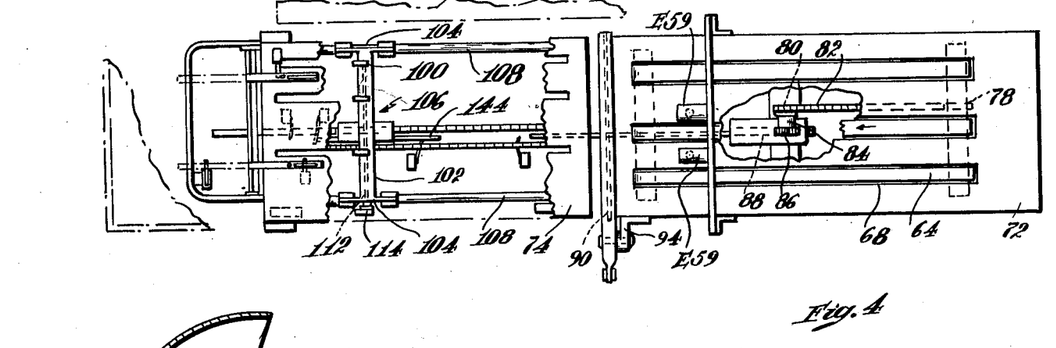
FIG. 4 is a plan view of FIG. 3, broken away in part.

At the left-hand side of the scray there is a support having first and second supporting surfaces 72 and 74 arranged in line and a third supporting surface 76 at one side of the second supporting surface. The tubular material is delivered onto the upper surface of a conveyor 73 comprised of a plurality of horizontally disposed, spaced parallel conveyor belts 64 which, as shown in FIG. 3, are entrained about rollers 66, with their upper runs occupying slots 68 in the first support 72. One of the rollers 66 has fastened to it a sprocket 78 (FIG. 4), and on the support, below the supporting surface 72, there is mounted a second sprocket 80. A chain 82 is entrained about the sprockets 78 and 80 and rotation of the sprocket 80 will accordingly impart movement to the belt 64. The sprocket 80 is fixed to a one-way clutch assembly 84 and the latter has on it a gear 86 engaged with a rack bar 88. Movement of the rack bar 88 in a direction toward the right, as seen in FIG. 3, through the clutch, will effect rotation of the sprocket 78 so as to move the upper runs of the belts 64 toward the left. Movement of the belts 64 toward the left advances the tubular material along the supporting surface 72 beneath a cutter 90 fixed to a bar 92. The bar 92 is pivotally mounted on a bracket 94 and is connected to a rod 93 protruding from an air cylinder 95, by means of which it may be actuated to raise and lower the cutter.

As the leading end of the tubular material is advanced by the conveyor belts 64, forwardly, relative to the cutter, it is engaged by a second conveyor 75 and pulled forwardly, relative to the cutter, until a pillow slip length thereof is drawn beneath the cutter. The second conveyor has a plurality of picker fingers 100, three such fingers being shown herein disposed transversely of the direction of movement of the tubular material. The picker fingers 100 are mounted on a horizontally disposed bar 102, the ends of which are fixed to two slides 104 and constitute therewith a carriage 106 slidably mounted on spaced parallel, horizontally disposed rods 108. The ends of the rods 108 are fixed to brackets 110 on the support. The picker fingers 100 are fixed to a rod 112 which is pivotally supported by the bar 102 and has, at one end, a downwardly extending lever 114 which, when rocked in one direction, will press the picker fingers 100 downwardly against the top of the bar 102 and, when rocked in the other direction, will elevate the fingers from the bar. The carriage 106 is connected to a chain 116, the latter being entrained about sprockets 118—118 mounted on shafts 120—120 journaled on the support. On the sprocket shafts 120—120 there are smaller sprockets 122—122 about which there is entrained a chain 124. A clamp 126 is fastened to the chain 124 and has pivotally connected to it one end of a driving rod 128, the opposite end of which is pivotally connected to a disc 130. The disc 130 is fixed to one end of a shaft 132 journaled in a bearing 134, the latter having a pulley 136 fixed to it. A belt 138 is entrained about the pulley 136 and a pulley 140 driven by a motor M30. Rotation of the disc imparts reciprocating motion to the chain 124 and, by way of the clamp 126, reciprocating motion to the carriage and hence to the fingers 100. Resilient balls 142 are mounted on the bar 102, one beneath each finger. The carriage 106 has fixed to it a rearwardly projecting rod 144. The rack bar 88 has a forwardly extending shank 148 which is aligned with the rod 144, so that when the carriage 106 moves rearwardly, the rod 144 engages the shank 148 and moves the rack 88 toward the right, as seen in FIG. 3. As thus constructed, movement of the fingers to the right, that is, in a direction toward the cutter and the leading end of the tubular material, advances the tubular material beneath the cutter toward the fingers. Near the right-hand extremity of the movement of the fingers there is a cam lifter 150, which is arranged to intercept the cam lever 114, so as to rock the fingers upwardly away from the bar 102 to permit the leading end of the tubular material to slide between the fingers and the bar. As the carriage is retracted the cam lever 114 moves away from the cam lifter 150, thereby allowing the fingers 100 to clamp the leading end of the tubular material against the bar 102 and to draw it toward the left beneath the cutter. At the left-hand extremity of the movement of the carriage the lever 114 engages a second cam lifter 152 to release the leading end of the tubular material. At this point, the cutter 90 is actuated to cut off a length of tubular material to form an open-ended tube of the size desired for making a pillow slip.

Figure 5:
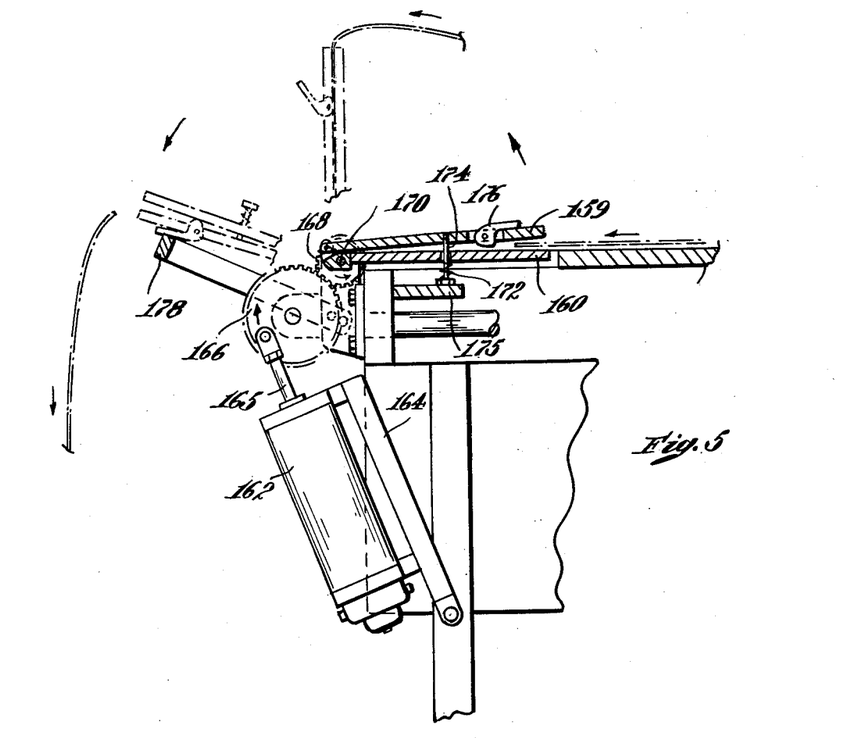
FIG. 5 is an elevation, partly in section, to much larger scale of the waste-ejector.
Figure 5A:
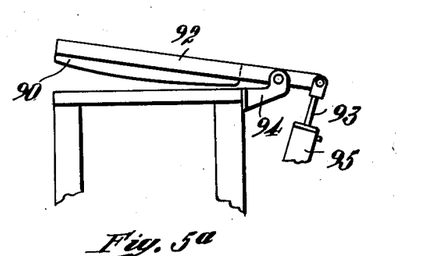
FIG. 5a is a transverse section taken on the line 5a—5a of FIG. 4.
Figure 5B:
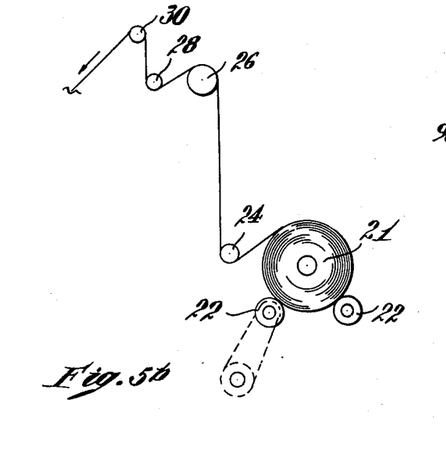
FIG. 5b is a schematic elevation of the doubler mechanism.

It is customary when a roll of the sheet material is used up to attach the leading end of another roll to the trailing end of the material which is nearly used up by hand sewing the two ends together to save time in threading up. When this seam appears in a pillow slip the latter must be discarded, however, much of the waste may be eliminated if the seam is cut out and a new pillow slip is formed immediately thereafter. To this end a seam detector in the form of a photoelectric switch E59 is mounted on the support above the belts 64. The detector operates, as will appear hereinafter, to cause the cutter 90 to cut the material rearwardly of the seam, that is, just as the seam moves forwardly beyond the cutter and then to cause the fingers 100 to advance the defective piece toward the left where it is ejected through a discharge tube 156. Discharge is effected by a doffer 158 (FIG. 5), having pairs of pivotally mounted upper and lower jaws 159 and 160, between which the leading end of the tubular material is advanced as the fingers 100 draw toward the left, as seen in FIG. 3. The jaws 159 and 160 are situated intermediate the fingers 100 and extend rearwardly beyond the rearmost position of the fingers at their extreme left-hand position. Normally, the doffer jaws 159 and 160 are held out of engagement so that a perfect pillow slip can be transferred to the third section of the machine for end-seaming. The upper jaws 159 are held away from the lower jaws by bolts 174 screwed into each upper jaw 159 and extending downwardly therefrom through holes in the lower jaws into engagement with abutments 175 therebelow. Springs 172 are mounted on the lower ends of the bolts, between the lower jaws and the heads of the bolts. When the detector is actuated by the presence of the seam, or other defects, a circuit is established, as will appear hereinafter, which supplies air to a cylinder 162 fixed to a bracket 164 pivotally mounted at its lower end on the support. The cylinder 162 contains a rod 165, the protruding end of which is pivotally connected to a pinion 166. The pinion, in turn, meshes with the gear 168. The gear 168 is fastened to a shaft 170 which is operable to rotate the doffer jaws 159 and 160 upwardly and forwardly, as shown by the arrows, to lift the defective piece and carry it forwardly into the discharge tube 156. As the lower jaws 160 are raised they close against the upper jaws on the edge of the defective piece. Near the end of their forward movement latches 176 on the upper jaws engage fixed stops 178 to separate the jaws and hence release the piece.

Figure 2:
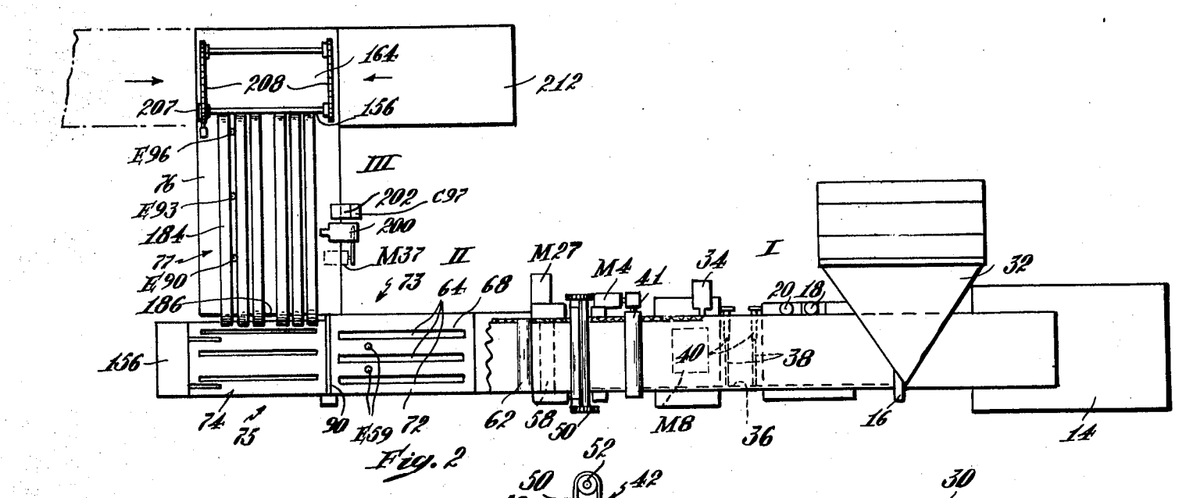
FIG. 2 is a plan view of FIG. 1, showing, in addition, the end sewing machine and the stacking means.
Figure 6:
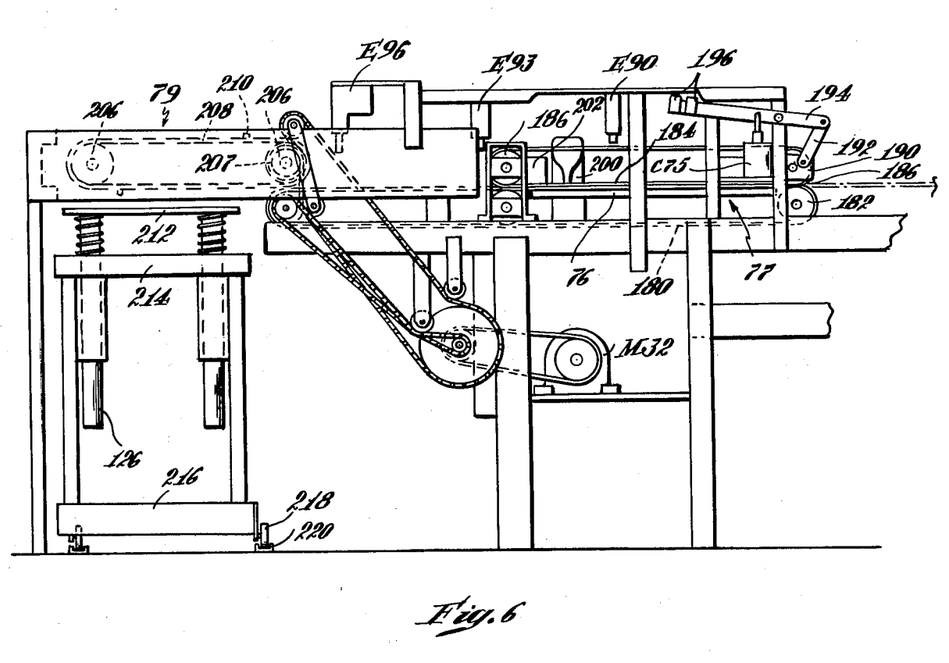
FIG. 6 is an elevation, to larger scale, of the left end of FIG. 2, showing the end-seaming mechanism, conveyor and stacking mechanism.

After the tubular material is cut it is moved to the third section for sewing of one end, so as to provide a pillow slip folded along one edge, sewn along the other edge and sewn at one end. The transfer of the open-ended slip from the second section to the third section is effected by a third conveyor 77 comprised of lower belts 180, entrained about rollers 182 with their upper runs in the plane of the supporting surface 76 and the upper belts 184 entrained about rollers 186. The right-hand one of the rollers 186 is supported so as to overlap the supporting surface 74 and is movable up and down relative to the surface 74 and the lower belts 180. As illustrated in FIG. 6, rollers 182 are fixed so that the upper runs of the belts, entrained about these rollers, lie in a plane corresponding to the surface of the support 76. The upper rolls 186 however are so supported that the lower runs of the belts, entrained about these rollers, may be moved into and out of parallel relation to the upper runs of the lower belts. To this end, the roller 186 at the right end, is mounted in bearings 190. Links 192 are pivotally connected to the bearings 190 and to levers 194. The levers 194 are, in turn, pivoted on the frame and carry counterweights 196. The roller 186 is quite heavy and so by its own weight holds the upper belts engaged with the lower belts. Solenoids C75 connected to the levers 194 are provided to lift the roller and elevation is assisted by the counterweights 196. When the tubular material has been cut the roller 186 is lowered by de-energization of the solenoid to permit the belts 184 to engage the edge of the open-ended tube, whereupon, the upper and lower belts cooperate to transfer the open-ended slip laterally between them along the support 76 toward a sewing machine 200 mounted on the support, adjacent an edge thereof, which stitches the right-hand end of the open-ended tube, as shown in FIG. 2. The belts carry the completed pillow slip by the sewing machine 200 for end sewing and by a thread cutter 202 which clips off the thread.

There are three photoelectric switches situated along the support 76 which control the movement of the slip so that they are intermittently advanced toward the stacker in timed relation with the preceding intermittent motion of the tubular material, that is, a cut slip moves off the support 74 onto the support 76 and stops, whereupon, a new length of tubular material is advanced into position on the support 74 for cutting, then the cut slip is moved off the support 74 onto the support 76 and the preceding slip is moved by the bottom sewing machine for sewing the end, whereupon, both the open end slip and the closed end slip are stopped until another length of tubular material is drawn into position for cutting and then all three slips are moved so as to transfer the finished slip to the stacker, the open end slip to the end sewing machine and the cut slip into a position on the support 76 preparatory to sewing. These photoelectric switches are shown at E90, E93 and E96 and will be described hereinafter in connection with the circuit diagram.

The lower belts 180 extend beyond the upper belts and underlie, at their left end, a stacking conveyor 79 comprised of pairs of sprockets 206—206, about which are entrained chains 208—208. Jaws 210 are fastened to the chains 208—208 and, by rotation of the chain, engage the edge of the completed slip resting on the lower belts 180 and transfer it therefrom to one of the two supporting tables 212—212 mounted on a dolly 216, or to the topmost slip on a pile of pillow slips resting on a table 212.

Figure 7:
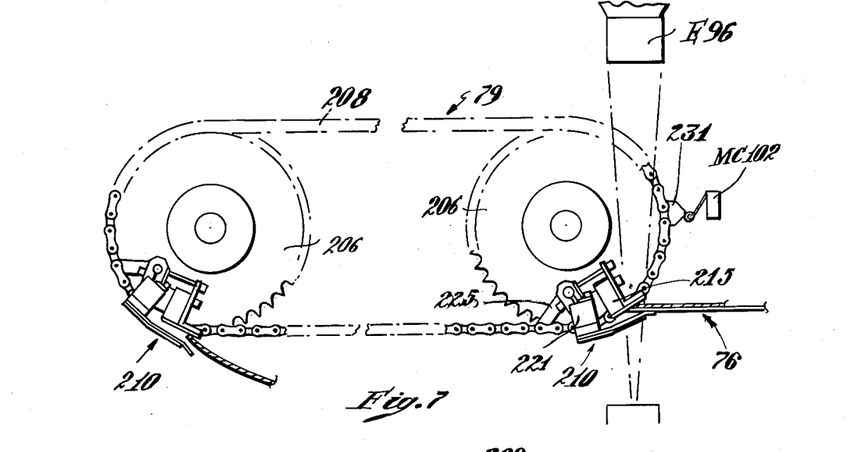
FIG. 7 is an enlarged fragmentary elevation of one of the stacking conveyor chains, showing a jaw ready to close on a pillow slip and another just releasing a slip.
Figure 8:
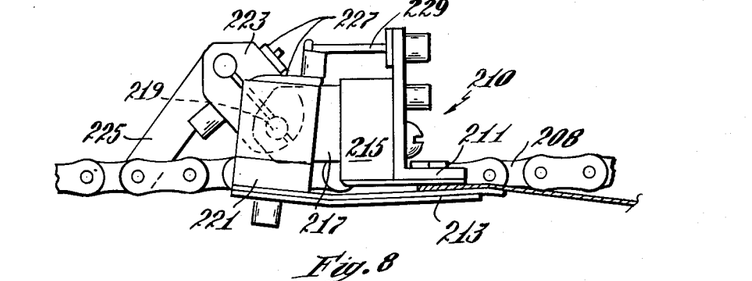
FIG. 8 is an enlarged elevation of one jaw shown closed on a pillow slip.

Each jaw comprises an upper and lower gripper 211 and 213. The gripper 211 is fastened to a block 215, the latter being, in turn, fastened to the chain and has extending rearwardly therefrom a rigid boss 217 rotatably mounting a pin 219. The gripper 213 is fixed to a block 221 and the latter is fastened to one end of the pin 219. A clamp 223 is fixed to the other end of the pin and is, in turn, connected by a link 225 to the chain 208. A coiled spring 227 is mounted on the pin with one end fastened to the block 221 and the other end to the clamp 223 and operates on the block 221 to urge it in a counterclockwise direction when the portion of the chain, within which the jaw is situated, is straight (FIG. 8), to hold the gripper 213 engaged with the gripper 211. When the chain lies along a curve (FIG. 7), as it does when it passes around a sprocket at the end of the conveyor, the block 221 is tilted clockwise by the link 225 to separate the grippers. A limit stop 229 extends rearwardly from the block 215 to control the separation.

The chains are brought to a stop with the jaws 210 at the level of the conveyor 76 and open as seen at the right-hand end (FIG. 7) by means of a lug 231 fastened to one of the chains which opens a switch MC102 at the moment the jaws reach the level of the conveyor 76. The photoelectric cell E96 is adjacent the forward end of the transfer conveyor 79 so that when the edge of a pillow slip moves into the open jaws it intercepts the beam and thus restarts the motor which drives the conveyor so as to draw the pillow slip onto the table. As soon as the conveyor starts the jaws close on the pillow slip and remain closed until they reach the rear sprockets, whereupon they are opened as the chains pass around the sprockets to release the slip.

The tables 212 are spring-supported on vertically disposed legs 126, so as to receive five dozen pillowcases, the increasing weight of the pillowcases automatically lowering the table to accommodate the pillow slips as they accumulate.

Figure 9:
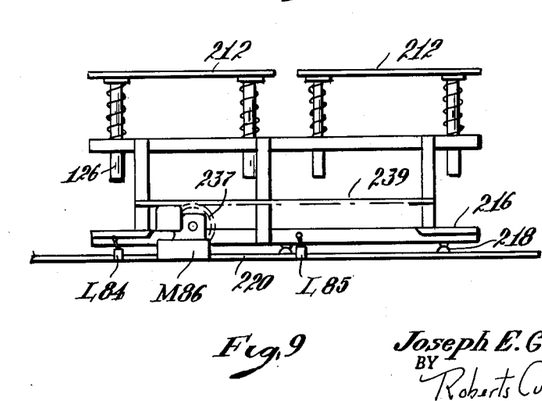
FIG. 9 is an end elevation of the stacking tables.

When five dozen slips have been stacked the dolly 216 upon which the stacking tables 212—212 are mounted and which, in turn, is supported by wheels 218 resting on tracks 220, is moved laterally to bring the empty table into position beneath the transfer conveyor, so as to permit the stacked slips to be removed. Movement of the dolly 216 is effected by the reversible motor M86 which drives a gear 237. The gear 237 meshes with a rack 239 fixed to the dolly (FIG. 9), so that rotation of the gear, in one direction, moves the table one way and, rotation in the opposite direction moves it the other way. There are limit switches L84 and L85 which stop the tables in positions beneath the conveyor. Movement of the tables is initiated by closing the switch S82 which reverses the current through the motor starter S83. A Veeder counter V is pulsed each time the photoelectric cell E90 is intercepted by a pillow slip and when the count reaches five dozen it closes switch S82 so as to shift the loaded table out of position and the empty table into position.

There are, of course, motors and control switches situated at appropriate places on the apparatus for bringing the various operative parts into and out of operative relation and these will now be described.

Figure 10:
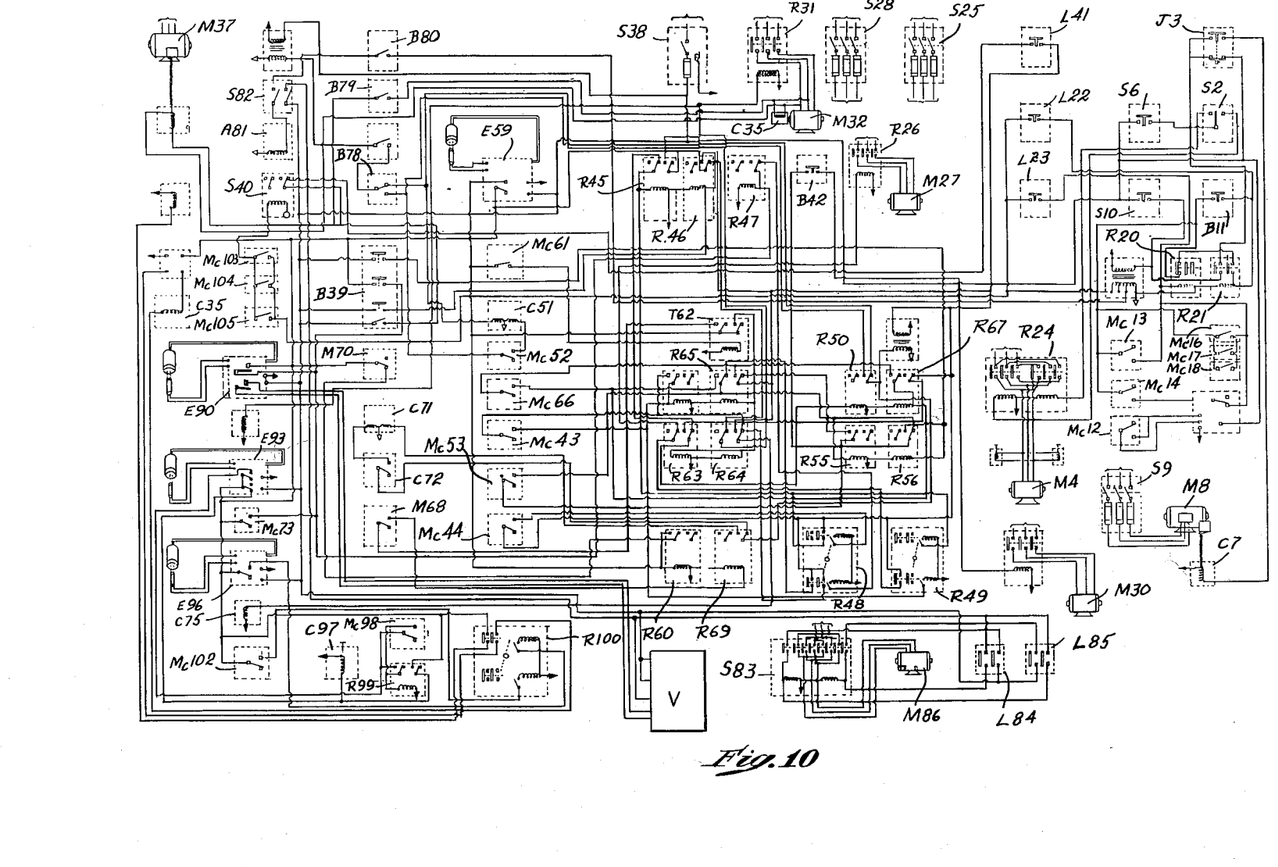
FIG. 10 is a wiring diagram for the apparatus.

A motor M4 is provided for driving the puller and doubler assembly, a motor M8 for driving the side sewing machine 34, a motor M27 for driving the nip rolls 62, a motor M30 for effecting movement of the conveyors 73 and 75 for side-seaming and cutting, a motor M32 for driving the side conveyor 77 for end-seaming (bottom) and stacking conveyor 79, a motor M37 for driving the bottom sewing machine 200 and a motor M86 for effecting movement of the stacking dolly. The motor M4 is provided with a reversing starter R24 which, in turn, is connected by way of a switch S25 to a 550 volt supply. The motor M8 is connected directly by way of a switch S9 to a 220 volt source. The motor M30 has a motor starter R29 which is also connected by the switch S28 to the 220 volt supply. The motor M32 has a motor starter R31 and is connected to the 220 volt source through the switch S28. The motor M37 is connected to a 220 volt supply and it has a solenoid-operated clutch C87 controlled by a switch S38. The motor M86 has a reversing motor starter R83 which is connected to the 550 volt source.

In the circuit of the motor M4 there is a reversing switch S2 operable through the reversible motor starter R24 to drive the motor M4 in either direction and a jog button J3 for operating the motor M4 intermittently when threading the cloth into the pulling and doubling assembly preparatory to operation. The side sewing machine motor M8 is started by a foot treadle-operated switch S6 which, in turn, energizes a solenoid-operated clutch C7 to start the stitching operation. A switch S10 provides for disconnecting the circuit containing the motors M4 and M8. A reset button B11 is provided for re-establishing the circuit for the motors M4 and M8 when it is broken by any one of a series of microswitches which are responsive to improper operation of the machine. These microswitches are a switch MC12 for by-passing the seam, a switch MC13 for detecting that the edges of the folded material are not being sewn, a switch MC14 which detects cloth bunching and switches MC16, MC17 and MC18 which detect a broken thread in the side sewing machine. Holding relays R20 and R21 are provided in the circuit for the motors M4 and M8 which, in conjunction with limit switches L22 and L23, function respectively, to start the side sewing machine M8 and the puller and doubler assembly motor M4 when the compensator roll 48 reaches a predetermined upper position and to stop the motors M4 and M8 when the compensator roll reaches a predetermined lower limit.

A push button switch B39 has a contact *a* for "off" and "on" control of the whole apparatus, a contact *b* for jogging the motor M32 for the side conveyor 77 and stacking conveyor 79, which operates through a relay R46, a contact *c* for jogging the motor M30 for the conveyors 73 and 75, which operates through a relay R56, and a contact *d* which, through relay R47, by-passes the photoelectric switch E90. A switch S40 provides for shutting down the apparatus for a broken thread in the bottom sewing machine. For emergency shut-down, in the event that the switch S22 does not work when it should, there is a limit switch L41. A manually operable toggle switch B42 is provided to disconnect the motor M30. The microswitch MC43 is located adjacent the cutter 90 and is operable as the pick-up fingers of the conveyor 75 commence to move forward to start the nip roll motor M27, through relays R48 and R49. A microswitch MC44, at the forward end of the side-seaming support, is operable by the pick-up fingers of the conveyor 75, when they reach that end, to stop the nip roll motor M27 through the relays R48 and R49, to actuate the cutter 90 through relays R45 and R50, lower the top roll 186 of the side conveyor 77 by energizing solenoid C75 and energize relays R45 and R48 which stop the motor M32 for the side conveyor 77, the bottom sewing machine motor M37 after a lag, and actuate the solenoid C97 of the thread cutter 202 without lag. The relay R48 has to be energized both to latch it and unlatch it to start and stop through the relay 49 and this latter is energized by microswitches MC43 and MC44. The relay M45 operates as a timer, supplying current to a solenoid C51 which, in turn, supplies air to the cylinder to lower the cutter 90. A microswitch MC52 unloads the air cylinder to bring the cutter to the "up" position. A microswitch MC53, situated between the ends of the path of movement of the conveyor 75, is operable to stop the motor M30 through relay R55 to by-pass the conveyor, if desired. In the event that the photoelectric switch E59 of the seam detector does not detect a seam, microswitch MC73, at that end, resets the circuit so as to return the conveyor 75 for the next pillow slip length and a relay R74 holds the nip roll drive motor M27 energized so that the nip rolls feed tubular material to the side conveyors for cutting and movement of the cut slip to the forward end of the support 74.

As the slip is moved laterally by the side conveyor 77, it intercepts a photoelectric switch E90 and the latter stops the side conveyor 77, the stacking conveyor and sewing machine motor M37, energizes the solenoid C75 to lift the top roll of the side conveyor and starts the pick-up finger drive motor M30. Thus, it is possible for the pick-up fingers to advance another length of tubular material for cutting. A photoelectric switch E93 operates through relay R99 to energize the thread cutting solenoid C97 for cutting the thread for the bottom sewing machine. Microswitch MC98 provides for unloading the solenoid C97. A photoelectric switch E96 energizes relay R100 which, in turn, actuates the clutch C35 between the stacking conveyor and its motor M32, so as to draw a finished slip onto the stacking table. A microswitch MC102 actuated by a lug 231 on the stacking conveyor de-energizes relay R100 to stop the stacking conveyor when the pillow slip is directly above the table. Microswitches MC103, MC104 and MC105 provide for stopping the apparatus for thread breakage in the bottom sewing machine.

A push button B78 is provided for manually operating the cutter 90 up or down. A toggle switch B79 is provided for manually stopping the bottom sewing machine 200. A toggle switch B80 is provided for manually shutting off the stacking arm A81 and a manually operable switch S82 is provided for effecting operation of a counter.

If the photoelectric switch seam detector E59 is energized by the presence of a seam, relay R60 is energized. A microswitch MC61 holds the actuating circuit while a mechanical ratchet is engaged. Actuation of the cutter 90 is delayed until the seam passes it by a timer switch T62 which also makes possible the operation of the seam detector mechanism which ultimately results in ejection of the defective slip. Relays R63, R64 and R65 operate to stop the nip roll motor M27 after seam detection, to stop the side conveyor motor M32, to transfer the cutter-actuating circuit to the detection circuit, to lift the top roll of the side conveyor and to transfer the pick-up finger control to the detection circuit. Microswitch MC66 is actuated when the cutter is fully down to energize a holding relay R67 which holds the pick-up finger motor engaged and returns the cutter to an "up" position. Microswitch MC58 energizes relay R69 which actuates solenoid C71 of the air motor to eject the seam. Microswitch MC70 stops the pick-up finger drive motor, returns the seam ejector to its down position and de-energizes the detector circuit. Microswitch MC72 unloads the seam ejector air motor.

The reversible motor M86 operates to move the dolly supporting the stacking table alternately from one side of the stacking conveyor to the other and reversing of the motor starting switch S83 is controlled by limit switches L84 and L85.

It should be understood that the present disclosure is for the purpose of illustration only and that this invention includes all modifications and equivalents which fall within the scope of the appended claims.

I claim:
1. In an apparatus for making pillow slips, a support having first and second supporting surfaces arranged end-to-end, a cutter bar disposed between the adjacent ends of the supporting surfaces, a first conveyor associated with the first supporting surface for advancing the leading end of tubular material therealong toward the cutter bar, a picker associated with the second supporting surface, a carriage mounting the picker for movement toward and from the cutter bar, said picker comprising a bar disposed transversely of the carriage and a plurality of transversely spaced fingers pivoted thereon, means normally holding the fingers engaged with the bar, and a cam operable to lift the fingers away from the bar, means for effecting reciprocation of the carriage, a cam-actuator disposed in the path of movement of the carriage, operable as the carriage moves toward the cutter bar, to intercept the cam and hence to raise the fingers from the bar, means fixed to the carriage and movable therewith, operable to effect forward movement of the first conveyor as the open fingers near the cutter bar, to advance the leading end of the tubular material between the fingers and the bar, said fingers closing on the leading end as the carriage commences to move away from the cutter bar, and means operable, at the forward extremity of the movement of the carriage, to effect operation of the cutter.

2. In an apparatus for making pillow slips, a support having first and second supporting surfaces arranged end-to-end, a cutter bar disposed between the adjacent ends of the supporting surfaces, a conveyor associated with the first supporting surface for advancing the leading end of tubular material therealong toward the cutter bar, a picker including a bar and fingers normally engaged therewith, a carriage mounting the picker for movement along the second supporting surface to and from the cutter, spaced parallel bars supporting the carriage for movement, means connected to the carriage for effecting reciprocation thereof, means including a one-way clutch operable to effect intermittent movement of the first conveyor toward the cutter, means on the carriage movable therewith to effect operation of the last-named means as the carriage is advanced toward the cutter, means for separating the fingers from the bar to receive the leading end of the tubular material as the latter is advanced beneath the cutter, said fingers closing on the leading end as the carriage moves away from the cutter, and means for effecting operation of the cutter when the picker reaches the forward extremity of its movement.

3. In an apparatus for making pillow slips, a support having first and second supporting surfaces arranged end-to-end, a cutter bar disposed between the adjacent ends of the supporting surfaces, a plurality of conveyor belts disposed with their upper runs adjacent the plane of the first supporting surface, means supporting the belts for movement of their upper runs toward the cutter bar, a chain connected to one end of said means, a one-way clutch including a gear about which one end of the chain is entrained, a rack for effecting operation of the clutch in a direction to move the belts toward the cutter, a carriage mounting a picker, spaced parallel bars supporting the carriage for movement along the second supporting surface toward and from the cutter, means connected to the carriage for effecting reciprocation thereof, a rod fixed to the carriage and extending forwardly therefrom, said rod being operable by engagement with said rack, as the carriage moves toward the cutter, to move the rack in a direction to effect operation of the clutch, means operable as the picker is moved toward the cutter to receive the advancing end of the tubular material, said picker being operable to grip the leading end as it moves away from the cutter, and means operable, at the termination of the movement of the picker, to effect operation of the cutter.

4. In an apparatus for making pillow slips, a support having first, second and third supporting surfaces disposed in a common horizontal plane, the first and second surfaces being in line and the third at right angles to the second, a cutter disposed between the first and second surfaces, a first conveyor associated with the first supporting surface, operable to advance tubular material from a source toward the cutter, a second conveyor associated with the second supporting surface, operable to grip the leading end of the tubular material and advance a pillow slip length onto the second supporting surface for cutting off a length of the pillow slip material, a sewing machine mounted on the support at an edge of the third supporting surface, a third conveyor mounted on the support lengthwise of the third supporting surface for removing the cut slip from the second supporting surface and feeding it relative to the sewing machine to close an end thereof, said third conveyor comprising upper and lower belts, the lower belts being disposed in the plane of the third supporting surface, the upper belts for engagement with the lower belts, said upper belts having portions overlapping the marginal edge of the second supporting surface, means supporting the overlapping portion of the upper belts for movement relative to the lower belts and said second supporting surface, said supporting means being of sufficient weight to hold the upper belts in contact with the lower belts, electrically operable means for raising the supporting means to lift the overlapping portions of the upper belts out of engagement with the lower belts and the second supporting surface, and weights arranged to counterbalance a part of the support.

5. In an apparatus for making pillow slips, a support having first and second supporting surfaces arranged end-to-end, a cutter disposed between the adjacent ends of the supporting surfaces for severing tubular material moved therealong transversely, conveyors associated with each supporting surface for moving tubular material from a source forwardly from the first supporting surface toward the cutter, and drawing a pillow slip length onto the second supporting surface for cutting off a length of the pillow slip material, a sensing device associated with the first supporting surface for detecting transverse seams in the tubular material, means operable in response to the detection of a seam to effect operation of the cutter immediately following movement of the seam forwardly of the cutter, to cut off a discard piece containing the seam, and means operable as the conveyor means advances the discard piece, to the forward end of its movement, to eject the discard piece.

6. In an apparatus for making pillow slips, a support having first and second supporting surfaces arranged end-to-end, a cutter disposed between the adjacent ends of the supporting surfaces for severing the tubular material moved therealong transversely, first and second conveyors associated with the respective supporting surfaces, the first conveyor advancing tubular material from a source toward the cutter, to said second conveyor, and the second conveyor drawing a pillow slip length forwardly, relative to the cutter, for cutting off a length of the pillow slip material, first means operable when the second conveyor has advanced a pillow slip length relative to the cutter to effect operation of the cutter to sever the material, a sensing device for detecting a transverse seam in the tubular material as the latter is moved toward the cutter, second means operable in response to said sensing device to render the first means ineffective and to effect operation of the cutter, independently of said first means at the instant the seam moves beyond the cutter to cut out the piece containing the seam, an ejector, and means operable by said second means to effect operation of the ejector to throw out the seam containing piece.

7. In an apparatus for making pillow slips, a support having first and second supporting surfaces arranged end-to-end, a cutter disposed between the adjacent ends of the supporting surfaces for severing the tubular material moving therealong transversely, first and second conveyors associated with the respective supporting surfaces, the first conveyor advancing the tubular material from a source forward the cutter, to said second conveyor, and said second conveyor pulling a pillow slip length forwardly, relative to the cutter, said second conveyor being movable forwardly to a predetermined position such that the distance between it and the cutter corresponds to the length of the slip to be cut, first means operable when the second conveyor reaches said predetermined position to effect operation of the cutter, a sensing device located at the rear side of the cutter for detecting imperfections in the tubular material, second means operable by the response of the sensing device to render the first means inoperative and to effect operation of the cutter when the imperfection reaches the forward side of the cutter, an ejector at said predetermined forward position of said second conveyor having open jaws between which the leading end of the material is advanced by said second conveyor, said jaws being operated by the second conveyor when it reaches its forward position to effect closing of the jaws on the leading end, and means operable following closing of the jaws to swing them forwardly to eject the imperfect length of material.

8. In an apparatus for making pillow slips, a support having first and second supporting surfaces arranged end-to-end, a cutter disposed between the adjacent ends of the supporting surfaces for severing the material moved therealong transversely, first and second conveyors associated with the respective supporting surfaces, the first conveyor advancing tubular material from a source of material toward the cutter, onto the second conveyor, and the latter pulling a slip length forwardly, relative to the cutter, said second conveyor being movable forwardly to a predetermined position such that the distance between it and the cutter corresponds to the length of the slip to be cut, first means operable when the second conveyor reaches said predetermined position to effect operation of the cutter, a sensing device located at the rear side of the cutter for detecting defects in the tubular material, second means operable by the response of the sensing device to render the first means inoperative and to effect operation of the cutter at the instant the defect clears the forward side of the cutter, ejector jaws, means pivotally supporting the ejector jaws adjacent said predetermined forward position of said second conveyor for receiving the leading end of the material, means operable at said forward position of the second conveyor, only when the sensing device has detected a defect, to close said jaws on the leading end of the defective piece, other means operable following the closing of the jaws to swing the jaws forwardly to discharge the defective piece, and a discharge chute arranged adjacent the end of the support for receiving the discharged pieces.

9. In an apparatus for making pillow slips, a support, a cutter associated therewith for cutting tubular material moved therealong transversely of its width, means for moving the tubular material along the support relative to the cutter, first means for effecting operation of the cutter when a predetermined length of material has been moved beyond the cutter, a sensing device ahead of the cutter, second means operable by the sensing device when the latter detects a defect to render the first means inoperative and to effect operation of the cutter with a time lag sufficient to permit the seam to move up to the cutter, and an ejector operable to eject the defective piece, operation of said ejector operating to restore the first means to operative condition and to render the second means inoperative.

10. In an apparatus for making pillow slips, a support, a cutter associated with the support, first means for moving tubular material along the support to a predetermined position relative to the cutter, to cut a slip length therefrom, a sensing device for detecting a defect in the tubular material, second means operable by the sensing device to render the first means inoperative, and to effect operation of the cutter with a time lag sufficient to permit the seam to move up to the cutter and thereafter to move the defective piece to said predetermined position, an ejector at said predetermined position operable by said second means, when the defective piece arrives at said position, to eject said piece, and means operable by the ejector at the termination of its operation to restore it to its initial position, to restore the first means to its operative posiion, and to render the second means inoperative.

11. In an apparatus for making pillow slips, a support, a cutter associated with the support for cutting tubular material moving therealong transversely, means for moving tubular material along the support to a predetermined position relative to the cutter, an ejector at said predetermined position into which the leading end of the tubular material is led, said ejector comprising pivotally associated jaws, means urging the jaws together, means at said predetermined position for holding the jaws separated, means mounting the jaws for swinging movement in unison away from said position, means for effecting said swinging movement, said jaws closing on the leading end simultaneously with initiation of said swinging movemet to lift the piece from the support, and means operable when the jaws reach a predetermined position clear of the support to separate them.

12. In an apparatus for making pillow slips, a support, a cutter associated therewith for cutting tubular material moved along the support, means for moving the tubular material along the support to a predetermined position with relation to the cutter, an ejector situated at said predetermined point, means mounting the ejector for swinging movement from said predetermined position, forwardly thereof, said ejector comprising pivotally associated spring-pressed jaws disposed with the lower jaws in the plane of the support, means at said predetermined position for holding the upper jaws out of engagement with the lower jaws in opposition to said spring, means for effecting rotation of the mounting means, initial movement of the ejector allowing said spring means to close the jaws, an abutment disposed forwardly of the support operable to limit movement of the upper jaws of the ejector, and cam means carried by the upper jaws operable by engagement with the abutment to separate the lower jaws from the upper jaws at said limiting position.

13. In an apparatus for making pillow slips, first and second supports arranged end-to-end, a cutter disposed between the adjacent ends of the supports operative to sever tubular material moved therealong transversely of its width, an intermittently operable conveyor situated at one side of the cutter, movable toward the cutter, to advance tubular material along the first support toward the cutter, a reciprocable conveyor situated at the other side of the cutter, said reciprocable conveyor having clamping means operative to grip and release an end of the tubular material presented thereto, said reciprocable conveyor being movable toward the cutter to receive the end of the tubular material delivered to it by the intermittently operable conveyor and away from the cutter to draw off a pillow slip length thereof, said reciprocable conveyor being operative, as it moves toward the cutter, to effect movement of the intermittently operable conveyor toward the reciprocable conveyor sufficiently to engage the end of the tubular material with the clamping means of the reciprocable conveyor, as it moves away from the cutter, to effect clamping of the clamping means to grip the tubular material and, at the end of its movement away from the cutter, to effect operation of the cutter to sever a pillow slip length from the tubular material.

14. Apparatus according to claim 13, comprising means for effecting reciprocation of the reciprocable conveyor, kinematic means including a one-way clutch for effecting movement of the intermittently operable conveyor, and means movable with the reciprocable conveyor, as the latter moves toward the cutter, to effect operation of said kinematic means to advance the intermittently operable conveyor toward the cutter.

15. Apparatus according to claim 13, comprising clamping fingers movable in reciprocation with the reciprocable conveyor, and cam means adjacent the cutter operative, as the reciprocable conveyor moves toward the cutter, to raise the clamping fingers for receiving the end of the tubular material and, as the reciprocable conveyor moves away from the cutter, to release said clamping fingers for gripping the end of the tubular material.

16. In an apparatus for making pillow slips, first and second supports arranged end-to-end, a cutter disposed between the adjacent ends of the supports operable to sever tubular material moved therealong transversely of its width, conveyors disposed lengthwise of the supports at opposite sides of the cutter for moving successive pillow slip lengths of the tubular material, forwardly beneath the cutter, along the second support for cutting off a length of the pillow slip material, a third conveyor disposed at one side of the second support with a portion overlapping, but raised from the plane of the second support, means for effecting operation of the cutter when the second conveyor reaches the forward extremity of its movement, and means operative, following the cutting of the tubular material, to move the raised portion of the third conveyor into engagement with an edge of the cut slip resting on the second support to remove it therefrom.

17. In an apparatus for making pillow slips, first and second supports arranged end-to-end, a cutter disposed between the adjacent ends of the supports operable to sever tubular material moving therealong transversely of its width, first and second conveyors disposed lengthwise of the first and second supports at opposite sides of the cutter for moving successive pillow slip lengths of the tubular material forwardly from the first support beneath the cutter to the second support for cutting off a length of the pillow slip material, at third support disposed at one side of the second support, a sewing machine mounted adjacent an edge of the third support, a third conveyor disposed lengthwise of the third support with a portion overlapping an edge of the second support, means for holding said portion of the third conveyor elevated from the second support so that it does not interfere with the forward movement of the tubular material along the second support to cutting position, and means operative, following cutting of the tubular material, to bring said portion of the third conveyor into contact with the margin of the cut slip resting on the second support to withdraw the slip and advance it to said sewing machine.

18. In an apparatus for making pillow slips, first, second and third supports disposed in a common horizontal plane, the first and second supports being in line and the third at right angles thereto, a cutter disposed between the first and second supports, a first conveyor associated with the first support operable to advance the tubular material from a source forwardly relative to the cutter, a second conveyor associated with the second support operable to grasp the leading end of the tubular material and advance a pillow slip length forwardly along said second support for cutting off a length of the pillow slip material, a sewing machine mounted on the third support adjacent an edge, a third conveyor mounted on the third support for removing the cut slip from the second support and feeding it to the sewing machine, said third conveyor comprising upper and lower belts, the lower belts being disposed in the plane of the second support and the upper belts for engagement with the lower belts, said upper belts having portions overlapping the marginal edge of the second support, means normally holding the overlapping portions of said upper belts above said second support, and means operable, when the slip has been severed, to bring the overlapping portions of the upper belts into engagement with the margin of the pillow slip resting on said second support.

19. In an apparatus for making pillow slips, first and second supports arranged end-to-end, a cutter disposed between the adjacent ends of the supports operable to sever tubular material moving therealong transversely of its width, an intermittently operable endless conveyor situated at one side of the cutter and movable toward the cutter to advance tubular material along the first support toward the cutter, a reciprocable conveyor situated at the other side of the cutter and movable toward the cutter to receive the end of the tubular material delivered to it by the intermittently operable conveyor and away from the cutter to a forward position to draw off a pillow slip length, means operative to effect movement of the conveyors so that, during movement of the reciprocable conveyor toward the cutter, the intermittently operable conveyor is moved toward the cutter and, during movement of the reciprocable conveyor away from the cutter, the intermittently operable conveyor is stationary, and means operative, as the reciprocable conveyor reaches the forward extremity of its reciprocable movement, to effect operation of the cutter.

20. Apparatus according to claim 19, comprising a scray for supplying tubular material to the intermittently operable conveyor, to which a surplus of tubular material is delivered, folded along one edge and sewed along the other, feeding means for delivering the tubular material to the scray, power-operable means for effecting operation of the feeding means, and control means for controlling operation of said power-operable means intermittently in timed relation with the movement of said intermittently operable conveyor.

21. Apparatus according to claim 18, comprising a vertically movable support adjacent the remote end of the third conveyor, a fourth conveyor for transferring the finished slip from the remote end of the third conveyor to said support, and counter means operable to shift said vertically movable support, when a predetermined number of slips have been piled thereon, from beneath said fourth conveyor.

References Cited in the file of this patent

UNITED STATES PATENTS

| | | |
|---|---|---|
| 588,283 | Meisel | Aug. 17, 1897 |
| 2,019,843 | Clark | Nov. 5, 1935 |
| 2,667,132 | Golden | Jan. 26, 1954 |
| 2,940,404 | Damon | June 14, 1960 |
| 2,962,989 | Golden | Dec. 6, 1960 |
| 2,996,982 | Alm | Aug. 22, 1961 |
| 3,011,375 | Muller | Dec. 5, 1961 |